May 1, 1973  P. J. WYATT ET AL  3,730,842
PROCESS FOR DETERMINING BACTERIAL DRUG SENSITIVITY
Filed May 4, 1970  2 Sheets-Sheet 1

INVENTORS.
PHILIP J. WYATT
RICHARD M. BERKMAN
BY DAVID T. PHILLIPS

Christie, Parker & Hale
ATTORNEYS

United States Patent Office 3,730,842
Patented May 1, 1973

3,730,842
PROCESS FOR DETERMINING BACTERIAL DRUG SENSITIVITY
Philip J. Wyatt and Richard M. Berkman, Santa Barbara, and David T. Phillips, Goleta, Calif., assignors to Science Spectrum, Santa Barbara, Calif.
Filed May 4, 1970, Ser. No. 34,243
Int. Cl. C12k 1/04
U.S. Cl. 195—103.5 R    21 Claims

ABSTRACT OF THE DISCLOSURE

There is described a method of rapidly determining the sensitivity of bacteria to one or more antibiotic agents. The process involves subjecting the test bacteria to a highly directional narrow beam of light and measuring the intensity of the scattered light as a function of scattering angle and repeating the measurement at successive time intervals to determine the changes in the pattern of scattered light intensity. Sensitivity of the bacteria to the antibiotic agent results in a very noticeable change in the light scattering pattern produced by the bacteria.

FIELD OF THE INVENTION

This invention relates to the control of microorganisms and, more particularly, is concerned with measuring the sensitivity of microorganisms to antibiotic and chemotherapeutic agents.

BACKGROUND OF THE INVENTION

The use of antibiotics and chemotherapeutic agents for the control of bacterial infections is well known. It is also known that some strains of bacteria which are normally thought to be sensitive, develop resistance to the effects of particular agents. Concerning antibiotic therapy, the treatment of bacterial infections has often been a matter of trial and error. In such cases patients are literally serving as human guinea pigs. But conclusive antibiotic test results on purified cultures may require several days when currently accepted methods are used. Such a process is too slow to be of great value in establishing the antibiotics of choice for the treatment of specific bacterial infections.

SUMMARY OF THE INVENTION

The present invention is directed to a method of making a very rapid determination of the sensitivity of test bacteria to a number of different antibiotic or chemotherapeutic agents. In brief, the process involves dividing a suspension of viable test bacteria into several tubes or flasks of liquid growth media or distilled water. To each may be added a different antibiotic agent or several different concentrations of a single antibiotic. A control culture is also provided to which no antibiotic agent is added. At successive time intervals, the test cultures are subjected to a highly concentrated beam of light. The intensity of light scattered at different angles relative to the position of the sample under test is measured to determine if the light scattering pattern undergoes any change. Changes in the differential light scattering pattern among the antibiotic-treated cultures relative to the control indicate inhibition or arrest of growth, unbalanced growth or other altered growth patterns due to the presence of a particular concentration of antibiotic. It has been found that bacteria that are sensitive to an antibiotic agent very quickly show marked changes in the light scattering pattern relative to the pattern which is produced by the same bacteria in the absence of the antibiotic agent. Bacteria which are resistant to the antibiotic agent, on the other hand, do not exhibit such changes in the light scattering properties.

BRIEF DESCRIPTION OF THE DRAWING

For a more complete understanding of the invention, reference should be made to the accompanying drawings, wherein.

DETAILED DESCRIPTION OF THE INVENTION

Figure 1:
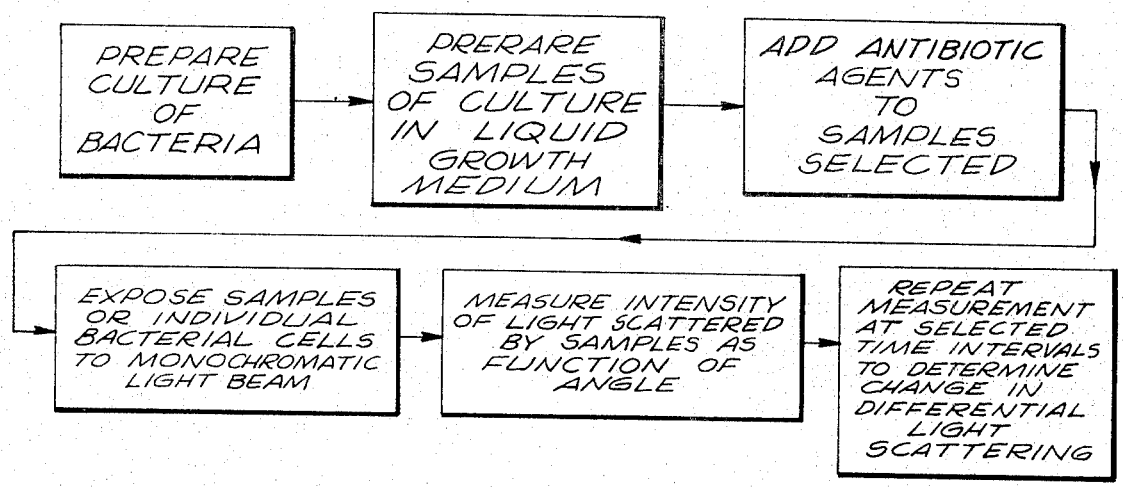
FIG. 1 is a block diagram summarizing the steps involved in carrying out the process of the present invention.

As shown by the block diagram of FIG. 1, the process of the present invention for determining the sensitivity of microorganisms to specific antibiotic agents involves first preparing cultures of the bacteria or other microorganisms being tested. A pure colony of the test bacteria, referred to as a clone, is suspended in distilled water, buffer solution, or liquid growth media and divided into several cuvettes. One cuvette of the bacterial culture is maintained as a control. To each of the other cuvettes is added, for example, a different antibiotic or several different concentrations of a single antibiotic.

Figure 2:
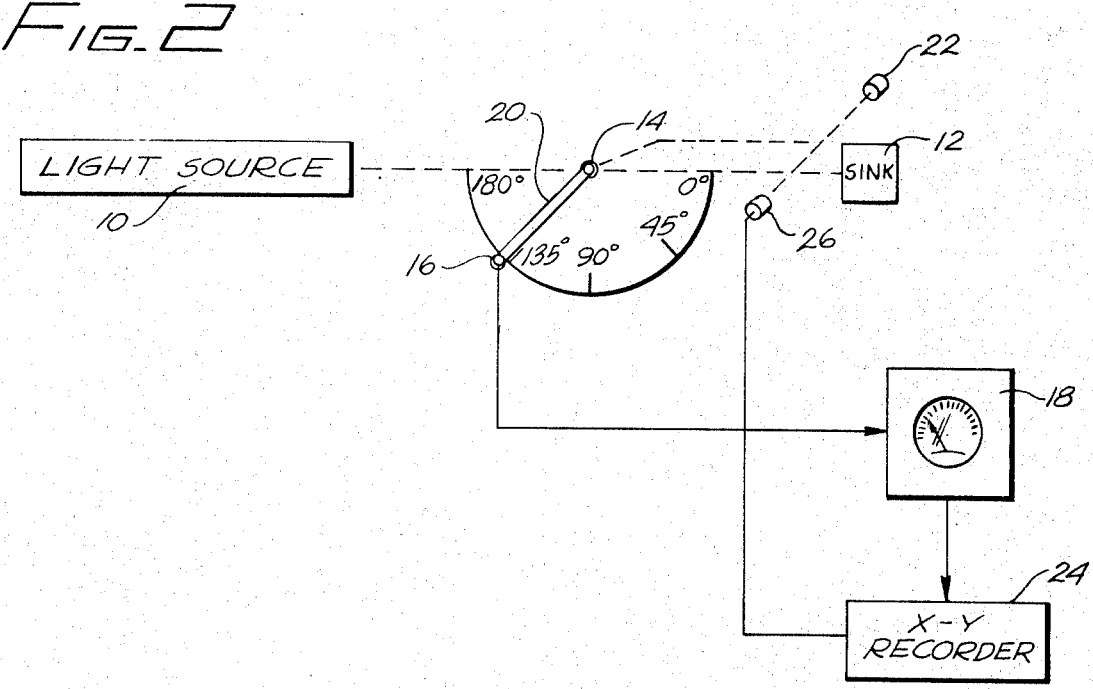
FIG. 2 is a schematic diagram of apparatus suitable for use in performing the process of FIG. 1.

The light scattering properties of each of the suspensions is then measured on a suitable photometer. As shown in FIG. 2, the photometer includes a light source 10 providing a high intensity monochromatic light beam. The source, for example, may be a laser beam which is directed along a path into a non-reflecting light sink 12. The cuvette containing the sample being tested is mounted in the beam, as indicated at 14. The photometer includes a photomultiplier tube 16 or other suitable detector for detecting light scattered by the sample culture in the cuvette 14. The detector 16 produces an output signal, the amplitude of which varies in proportion to the incident light. The output of the detector is connected to a suitable measuring device 18 which provides an indication of the changes in intensity of the incident light on the detector 16. The detector is mounted on an arm or other suitable mounting means by which it can be rotated angularly with respect to the cuvette 14 which is located at the center of the circular arc described by the rotating detector. Continuous scanning rotation may, for example, be provided by a motor 22 which is connected to the supporting arm 20 to rotate the detector 16 through substantially a 180 degree angular range.

A signal from the measuring unit 18 may be applied to one coordinant of an XY recorder 24. A transducer 26 coupled to the drive motor 22 provides an output signal proportional to the angular position which is applied to the other coordinant of the XY recorder 24. Thus the XY recorder provides a plot of scattered light intensity as a function of the light scattering angle.

Figure 3:
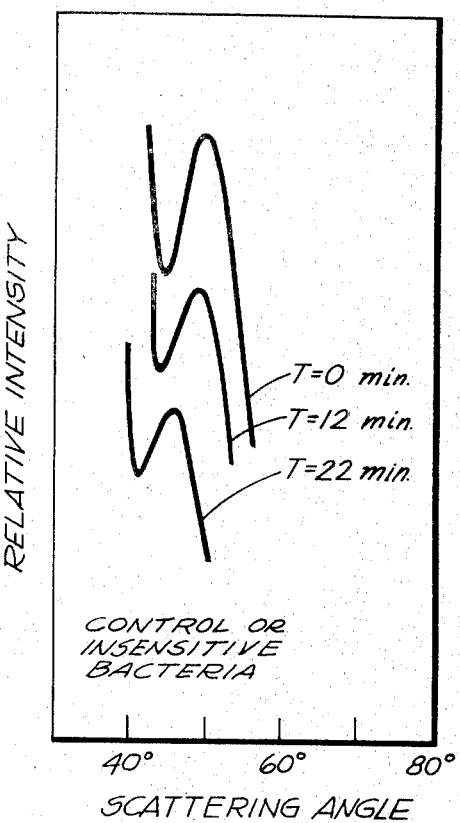
FIGS. 3 and 4 are graphical representations of the changes in the light scattering properties for sensitive and insensitive microorganisms.
Figure 4:
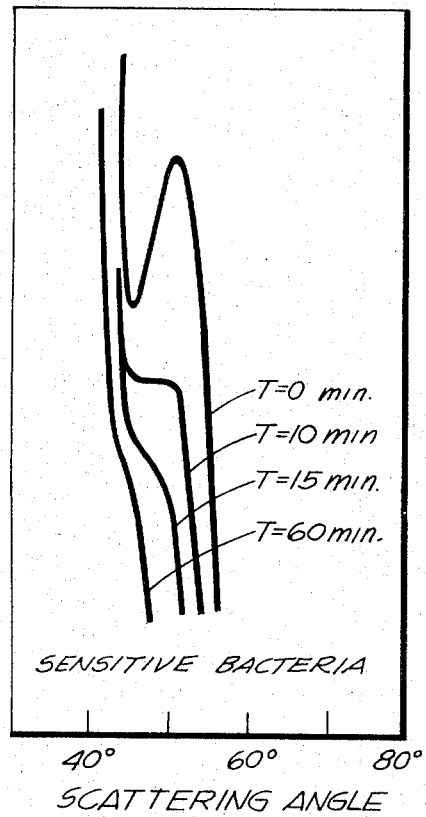

By taking measurements on each of the cuvettes, including the control, at selected intervals of time, any changes in the light scattering characteristics among the antibiotic-treated cultures relative to the control can be detected. Each particular strain of bacteria exhibits a characteristic light scattering pattern. This pattern remains stable in a control culture over a long period of time. On the other hand, a culture sensitive to an antibiotic exhibits changes in the light scattering pattern within a relatively short time interval, such as a few minutes after addition of the antibiotic. FIG. 3, for example, shows the light scattering pattern of a control culture taken at three different times over a period of twenty-two minutes. It will be seen that no significant change in the characteristic light scattering pattern takes place. However, as shown in FIG. 4, when the same measurements are made on a culture to which an antibiotic has been added, a very noticeable change in the light scattering pattern can be detected within ten minutes. The pattern continues to change during measurements taken at successively longer intervals. It has been found that antibiotic resistant bacteria exhibit the same characteristic light scattering pattern as that shown in FIG. 3. In other words, substantially no change in the light scattering pattern relative to the control can be observed.

The tests are preferably made on cultures of test bacteria grown in an enriched culture medium. After the samples are prepared, including the addition of selected antibiotic agents, the samples are incubated at temperatures which encourage maximum growth. However, satisfactory test results have been obtained by making the tests on pre-starved cells where the culture has been grown for several hours in a starvation medium to inhibit growth. Equally satisfactory results can be obtained, although the time required for the light scattering patterns to change is considerably slower.

From the above description it will be recognized that the above-described method provides a means of rapidly determining the effectiveness of antibiotics or other therapeutic agents in inhibiting or killing microorganisms. By comparing the light scattering properties of several samples, it is possible to detect rapidly the sensitivity of a microorganism to a number of different antibiotic or chemotherapeutic agents at the same time. While the method has been described in connection with testing of suspensions of bacterial cells, for example, suspensions of $10^5$ to $10^7$ cells/ml., it is possible to make sensitivity measurements on a representative number of individual cells using electronic equipment which permits suspension of single cells within the light beam during the taking of measurements, such as by the measuring apparatus described in copending application Ser. No. 777,837, filed Nov. 21, 1968, now U.S. Pat. No. 3,624,835, by one of the co-inventors of the present invention.

The measurements of the changes in light scattering patterns need not be confined to bacterial suspensions. Indeed, the same measurements may be made on individual bacterial cells, without need to purify mixed flora, or without need for preliminary culturing. The specimen taken from the patient (e.g., throat swab, urine sediment, etc.) is introduced directly into a holding medium (preferably a liquid). This medium is subsequently divided into aliquots, each of which is treated with the appropriate antibiotics, with one aliquot being reserved as a control. The light scattering patterns of a representative number of individual cells from each aliquot are then sequentially determined and these are then compared with patterns obtained for individual cells of the control. The patterns may be recorded digitally and immediately stored in a computer memory bank for subsequent comparisons.

What is claimed is:

1. Process for testing the sensitivity of a microorganism to chemical agents, comprising the steps of:
   preparing a microorganism control sample;
   inserting said sample into the path of an incident narrow, substantially monochromatic beam of light;
   measuring the intensity of radiant light scattered by said sample at more than two offset angular locations relative to the direction of said incident beam sufficient to derive a differential scattering control pattern produced by said sample;
   preparing a microorganism test sample by adding a selected chemotherapeutic agent of known concentration to a sample of said microorganism;
   placing said test sample into the path of said incident, narrow, substantially monochromatic test beam of light;
   measuring the intensity of light scattered by said test sample after a selected time interval at substantially the same said offset angular locations to derive a differential scattering test pattern produced by said test sample; and
   comparing said control and test patterns to determine relative differences therebetween, said differences providing an indication of the sensitivity of said microorganism to said selected chemical agent.

2. The process of claim 1, wherein:
   the microorganism is bacteria.

3. The process of claim 2, wherein:
   said bacteria are in liquid suspension.

4. The process of claim 2, wherein:
   said chemical agent is an antibiotic agent.

5. The process of claim 2, wherein:
   said test sample is a single cell of bacteria.

6. The process of claim 2, wherein:
   said scattered light intensity test measuring step is repeated.

7. The process of claim 3, wherein:
   the number of cells of said bacteria is in the order of $10^5$ or more.

8. The process of claim 5, wherein:
   successive single cells of bacteria are tested and said scattered light intensity test measuring step is applied to each said cell.

9. The process of claim 3, wherein:
   said liquid suspension includes a growth-inducing medium.

10. The process of claim 2, wherein:
    said angular locations and beam are in the same plane.

11. The process of claim 2, wherein:
    said light beam is in the visible region.

12. The process of claim 2, wherein:
    said comparison step takes place rapidly relative to the growth time of the bacteria.

13. The process of claim 2, wherein:
    said patterns are recorded digitally for computerizing said comparison step.

14. The process of claim 4, wherein:
    said test sample and comparison steps are repeated for a plurality of different antibiotic agents.

15. The process of claim 4, wherein:
    said test sample and comparison steps are repeated for a plurality of different concentrations of said antibiotic agent.

16. The process of claim 4, wherein:
    said test sample and comparison steps are repeated for a plurality of different combinations of antibiotic agents.

17. The process of claim 3, wherein:
    the number of cells of said bacteria is in the order of $10^5$ or more;
    said chemical agent is an antibiotic agent;
    said angular locations and beam are in the same plane; and
    said light beam is in the visible region.

18. The process of claim 17, wherein:
    said comparison step takes place rapidly relative to the growth time of the bacteria.

19. The process of claim 18, wherein:
    said pattern is recorded digitally for computerizing said comparison step.

20. The process of claim 19, wherein:
said test sample and comparison steps are repeated for a plurality of different antibiotic agents.

21. The process of claim 19, wherein:
said test sample and comparison steps are repeated for a plurality of different concentrations of said antibiotic agent.

References Cited

UNITED STATES PATENTS

| | | | |
|---|---|---|---|
| 2,436,145 | 2/1948 | Johnson | 195—103.5 R |
| 2,816,479 | 12/1957 | Sloan | 356—102 |

OTHER REFERENCES

Gotterer et al., "J. Biophys. Biochem. Cytology," 10: 15–21 (1961).

Goldberg, "Antibiotics," (1959).

ALVIN E. TANENHOLTZ, Primary Examiner

M. D. HENSLEY, Assistant Examiner

U.S. Cl. X.R.

356—103